US012345362B2

(12) United States Patent
Zver

(10) Patent No.: US 12,345,362 B2
(45) Date of Patent: Jul. 1, 2025

(54) HOSE COUPLING AND METHOD FOR USE IN ANALYSIS SYSTEMS

(71) Applicant: STRATEC SE, Birkenfeld (DE)

(72) Inventor: Martin Zver, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 18/371,786

(22) Filed: Sep. 22, 2023

(65) Prior Publication Data

US 2024/0117910 A1 Apr. 11, 2024

(30) Foreign Application Priority Data

Oct. 5, 2022 (LU) ........................................ 103026

(51) Int. Cl.
*F16L 37/248* (2006.01)
(52) U.S. Cl.
CPC .................................. *F16L 37/248* (2013.01)
(58) Field of Classification Search
CPC .............................. F16L 37/248; F16L 37/107
See application file for complete search history.

(56) References Cited

U.S. PATENT DOCUMENTS

| 383,360 | A | * | 5/1888 | Kiefer | F16L 37/248 |
|---|---|---|---|---|---|
| | | | | | 285/361 |
| 767,843 | A | * | 8/1904 | Smith | F16L 37/248 |
| | | | | | 285/361 |
| 921,368 | A | * | 5/1909 | Crook | F16L 37/248 |
| | | | | | 285/148.2 |
| 1,589,469 | A | * | 6/1926 | Homand | F16L 37/248 |
| | | | | | 285/376 |
| 6,095,572 | A | | 8/2000 | Ford et al. | |
| 9,839,912 | B2 | | 12/2017 | Oprea et al. | |
| 10,865,922 | B2 | * | 12/2020 | Corbett | F16L 37/107 |
| 2017/0284583 | A1 | * | 10/2017 | Eckard | F16L 37/107 |
| 2017/0299100 | A1 | * | 10/2017 | Leffler | F16L 37/107 |
| 2018/0128405 | A1 | | 5/2018 | Clason et al. | |
| 2019/0128460 | A1 | | 5/2019 | Fremont | |

FOREIGN PATENT DOCUMENTS

| CN | 112483747 | A | * | 3/2021 | ............ F16L 37/248 |
|---|---|---|---|---|---|
| DE | 102004025069 | A1 | * | 12/2005 | ............ F16L 37/107 |
| DE | 69928827 | T2 | | 8/2006 | |
| DE | 102017102052 | A1 | | 8/2018 | |
| EP | 2937616 | A1 | * | 10/2015 | ............ F16L 37/248 |
| EP | 4016546 | A1 | * | 6/2022 | ............ F16L 37/107 |
| WO | 0025844 | A1 | | 5/2000 | |
| WO | 2019234261 | A2 | | 12/2019 | |

* cited by examiner

*Primary Examiner* — Matthew Troutman
*Assistant Examiner* — Fannie Kee
(74) *Attorney, Agent, or Firm* — 24IP Law Group USA, PLLC; Timothy R. DeWitt

(57) ABSTRACT

A hose coupling for a fluidic connection in an analytical system, and a method of using the same. The hose coupling comprises a sleeve comprising a first hollow cylinder having a channel connected to a hose at one end and having a first opening for receiving a plug at the other end, the end for receiving the plug being at least partially surrounded by a locking ring and having a handle with a gripping surface on the opposite side to the locking ring; and a plug comprising a second hollow cylinder which is at least partially inserted into the opening of the sleeve, the end which is inserted into the plug having a hook on one side.

7 Claims, 4 Drawing Sheets

FIG. 7A
FIG. 7B
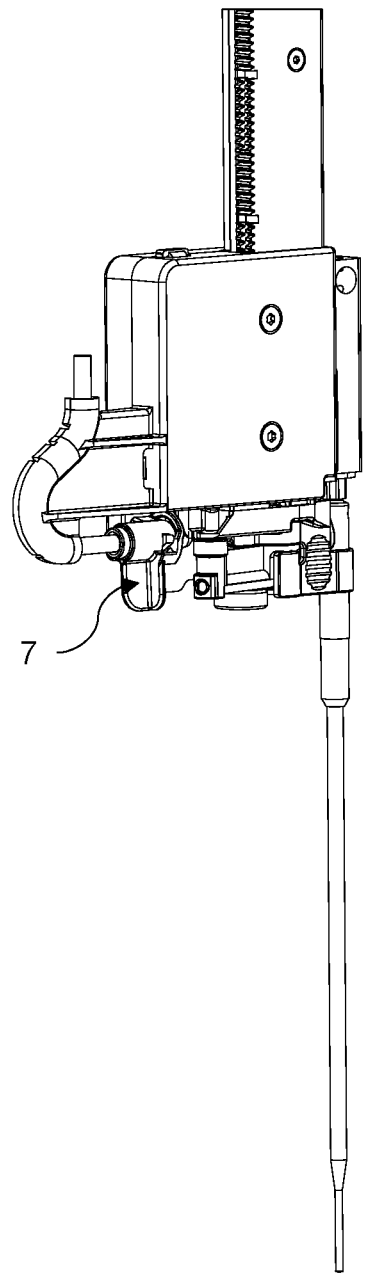
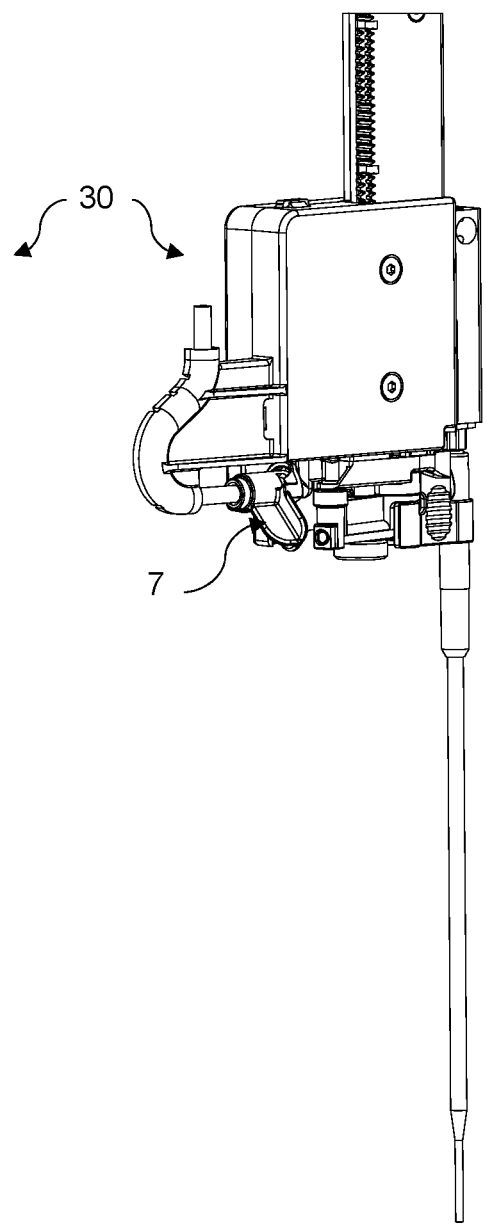

HOSE COUPLING AND METHOD FOR USE IN ANALYSIS SYSTEMS

CROSS-REFERENCE TO RELATED APPLICATION

The present application claims priority to Luxembourg Patent Application No. LU 103026 filed on Oct. 5, 2023. The aforementioned application is hereby incorporated by reference in its entirety.

BACKGROUND OF THE INVENTION

Field of the Invention

The invention relates to a hose coupling for use in analytical systems and a method of using the coupling.

Brief Description of the Related Art

Automated analyzer systems for use in clinical diagnostics and life sciences are manufactured by a number of companies. STRATEC® SE, Birkenfeld, Germany, for example, manufactures a range of sample handling and detection devices used in automated analyzer systems and other laboratory instruments.

The most common type of connection for hoses that transfer fluids are screw couplings. The parts to be connected are usually made of fluoropolymers such as PTFE or FEP, especially in the field of analytical and medical technology. These materials are media-resistant and pressure-resistant. Due to their strong creep behavior and relatively high hardness, these hoses cannot simply be plugged together for connection. Special fittings are used for such couplings.

The end of a pipe or hose is formed, or a flange is formed on its end using heat and pressure to create a tight connection between the fitting and its mating part. Such a formed flange seals between the face of the fitting and the threaded base of the mating part. A ring may be placed between the flange and fitting to decouple torsional forces that may occur when the fitting and mating part are tightened.

One disadvantage of this method is that the flange forming process requires a number of auxiliary devices or tools. On the one hand, a holding device for the tube is needed, and on the other hand, the actual forming tool. A heated mandrel is often used to heat the tube before forming. In addition, machined individual parts made of materials such as PEEK are often used, especially for this type of fitting. Assembly and parts manufacturing in particular make this type of connection costly. In addition, the manufacture of such a hose connection requires a certain amount of experience in assembly and is therefore not very user-friendly. The method applies only to hard fluoropolymer hoses. Thermoplastic elastomers cannot be formed with the required precision due to their elasticity and lower Shore hardness.

An alternative to forming the end of the tube or hose is an insert consisting of a seal with a cylindrical hose connection and a ring for rotational decoupling. For assembly, the fitting is pushed over the tube or hose, followed by the ring, and finally the insert is inserted into the tube or hose.

Similar to the connection with the molded hose, purely machined small parts made of high-quality plastics can often be used in this process. The sealing flange consists of a disc with a mandrel. This mandrel is inserted into the hose with a slight protrusion. Due to the high hardness of the hose and the small size of the components, this leads to increased effort during assembly. Inserting the mandrel into the hose reduces its cross-section, which leads to flow resistance in the system. Depending on the flow rate, the fluid is compressed in front of the mandrel and experiences expansion behind the reduction in cross-section, which can lead to undesirable turbulence.

Another option for sealing is to use an elastomer seal that is slipped over the end of the hose so that the seal is made on the outside of the hose. In this variant, the tightness to the hose and the actual sealing seat in the mating piece are created only by an elastomeric element. The tightness to the mating part in particular is therefore always dependent on the assembly. If the sealing part is pushed too far onto the hose, there is no connection between the elastomer and the mating part. Tightness is therefore no longer ensured. Assembly is difficult on the one hand because of the given tolerance problems and on the other hand because of the assembly forces required. It is recommended to use a mounting device. This increases the effort and thus the costs. As with the aforementioned methods, this connection technique is limited to the rather hard fluoropolymer hoses. Sliding the connector onto softer hoses would reduce its cross-section. In addition, it is questionable whether the sealing part can move at all due to the higher friction values.

A very simple method for connecting hoses with a Shore hardness below 85 A is to use a so-called barbed connector, in which the hose is slipped over a mandrel with a larger outer diameter than the inner diameter of the hose. To ensure a secure connection, the mandrel must be mushroom shaped. This is the most common, tool-less way to connect hoses. It is widely used when transporting fluids in the low-pressure range. The hose is simply slipped over the mating part. The resulting contact between the fitting and the hose, in some cases several times, ensures tightness between the two partners. However, this very process of putting the hose over the fitting also has a number of disadvantages. Firstly, depending on the hardness of the hose and the selected projection between the fitting and the hose, assembly is difficult. As the protrusion or hardness increases, the contact forces, which are usually applied manually, increase sharply. To counteract this, the projection can be reduced with increasing hose hardness or wall thickness. However, as the protrusion decreases, the compressive strength of the overall joint also decreases. In pressure applications and the use of highly pulsating pumps, this connection may exhibit undefined instability. The fitting is screwed into a mating fitting. If the hose is connected to the fitting before the fitting is screwed into the counterpart, the connection may loosen due to stresses in the hoses caused by twisting.

For quick connection and disconnection, a luer lock is very often used in medical devices. Such a connection is based on two coupling pieces, which are only connected and sealed by a self-locking cone. In the Luer-Lock variant, an external thread, which can be closed by a 90° rotation, results in additional contact pressure, which prevents the conical connection from being pulled apart and thus leaks. A disadvantage of a Luer lock is that the partners of the lock are twisted against each other with the result that the tubing is twisted in its elastic range. Under certain circumstances, this can cause the connection to loosen due to the elasticity of the tubing, resulting in leaks.

To prevent precisely this twisting of the hose, it can be pretensioned by a 90° turn against the closing direction of the thread. This has the advantage that the hose is free of tension when the coupling is closed. However, this pretensioning requires an attentive user, and the error rate is correspondingly high. To counteract this problem, there is a rotationally decoupled version. In this case, the locking thread is loosely connected to the actual Luer cone as an additional union nut. If the coupling is now to be closed, the counterpart can simply be attached. By tightening the rotationally decoupled union nut, the actual cone, which is connected to the hose, is pressed into the cone of the counterpart without any rotation of its own.

The locking thread of the Luer-Lock coupling is designed for an ergonomically comfortable ¼-turn. In order to sufficiently realize in this only 90° angle of rotation to connect the coupling partner from loose to tight, a rather large pitch is required. This large thread pitch reduces the self-locking of the thread to a significantly low level. As a result, this locking thread only locks reliably when the luer cone is firmly connected, and this locking also holds. In the rotationally decoupled version described, the friction of the luer cone is eliminated. The rotationally decoupled union nut can only jam due to the adhesion between the screw thread and the nut thread (self-locking). However, since this is reduced by the large pitch, there is always a risk of the locking thread loosening by itself. In this case, the holding force consists only of the two inserted Luer tapers. In dynamically loaded systems, oscillating or vibrating connections, as well as connections exposed to strong temperature fluctuations, this type of coupling can therefore very quickly lead to failures.

Published U.S. Patent Application No. US 2018/0128405 A1 relates to a single-acting push-to-connect fitting for a conduit, such as a tube or hose. The fitting includes a first fitting component and a second fitting component that are connected or assembled together to form a fitting assembly. The fitting assembly includes a conduit sealing device and a conduit retaining device. A conduit may be manually or otherwise inserted and held and sealed in the assembled fitting assembly with a single axial movement, without requiring any further action or movement of the fitting components. A disadvantage of a gland assembly according to the present invention is that it comprises multiple parts, which makes it complicated to assemble.

Published U.S. Patent Application No. US 2019/0128460 A1 relates to a hose endform having a first portion having a first radially outwardly facing surface and a shoulder axially disposed between the first and second portions, the shoulder having a first frustoconical surface disposed at a first angle relative to the first radially outwardly facing surface and a second frustoconical surface disposed at a second angle relative to the first radially outwardly facing surface. This document does not relate to a connector adapted to receive a hose for attachment thereof in the connector.

Published U.S. Pat. No. 6,095,572 A discloses a quarter-turn quick connect assembly for connecting miniature fluid lines, such as tubing, comprising a first fitting having radially projecting pins and a second fitting located within a rotatable quarter-turn nut having helical grooves that receive the pins. The first fitting defines a central passageway, and the second fitting defines a central passageway, each of which may be configured to slidably receive a hollow tube set or to threadably receive a mating externally threaded fitting. The quarter-turn quick connector can be configured to attach to the end of a column and can include an adapter to receive a guard column, or a frit to filter fluid flowing through the quarter-turn quick connector assembly. The quarter-turn quick connect is assembled by sliding the pins of the first fitting into the grooves of the quarter-turn nut and rotating the quarter-turn nut approximately 90 degrees with respect to the first fitting, thereby seating the pins securely in the defined angular ranges at the ends of the grooves.

Published international patent application WO 2019/234261 A2 discloses a method for connecting a suction hose for body fluids to a container, comprising the steps of— providing a hose adapter arranged on a hose section, a seal having at least one annular sealing surface, and a container on which a hose adapter counterpart is arranged,—establishing a mechanical contact between a first abutment surface provided on the hose adapter, the seal having at least one annular sealing surface, and a second abutment surface rotating the hose adapter from the first orientation to a second orientation, so that by an interaction between portions of the hose adapter and portions of the hose adapter counterpart the seal with at least one annular sealing surface is squeezed between the first contact surface and the second contact surface, as well as a suction hose for such a method and a hose quick connector which can be used therein.

Published International Patent Application WO 00/25844 A1 discloses an improved pump for controlled dispensing of fluids, the pump comprising a reservoir and a movable piston. A piston spool is in releasable contact with the movable piston. A motor is operably coupled to a drive member, such as a drive screw. The motor is arranged in series with the drive element and the plunger slide. The drive element is operably coupled to the plunger slide and arranged to be substantially enclosed by the plunger slide when the plunger slide is in at least one position. The drive element is adapted to move the plunger slide forward in response to operation of the engine.

Published U.S. Pat. No. 9,839,912 B2 discloses an analyzer for automated determination of a measurand of a fluid sample, comprising: a base module; a replaceable cassette connectable to the base module and having at least one fluid container connectable to a measurement cell via a fluid line and containing a reagent to be added to the fluid sample to form a measurement fluid; and a transducer for acquiring measurement values correlated to the measurand for the measurement fluid received in the measurement cell. The cassette includes a fluid coupling device associated with the at least one fluid reservoir, the fluid coupling device having a primary portion and a secondary portion for establishing a connection of the fluid conduit to the fluid reservoir.

The published German patent application DE 10 2017 102 052 A1 discloses a plug-in connection arrangement for detachably connecting a plug-in connector of a hydraulic line to a connection of a hydraulic system, and a method therefor. A receptacle is formed at a free end of the connector, which has at least two hooks. A curved structure of the hooks cooperates with a respective flexible clip of the connector in the connected state from the connection and the connector. A respective rigid clip of the connector then also engages behind each hook of the connector.

SUMMARY OF THE INVENTION

The present invention provides a hose coupling for a fluidic connection in an analytical system comprising:
  a sleeve comprising a first hollow cylinder, the channel of which is connected at one end to a hose and the other end of which comprises a first opening for receiving a plug, the end for receiving the plug being at least partially surrounded by a locking ring with a recess, the first opening of the sleeve for receiving the plug extending at one side into a second opening which continues as a channel extending along the radius of the first hollow cylinder of the sleeve; and
  the plug having a base plate from which extends a second hollow cylinder which has a hook arranged at the end opposite the base plate and extending radially outwards, the second hollow cylinder being configured such that it can be inserted at least partially into the opening of the sleeve and, during a rotational movement, the hook engages behind the locking ring of the sleeve for securing the plug against linear movement, the base plate of the plug having a projection with an edge which, during a rotational movement, engages in the recess of the locking ring of the sleeve for securing the plug against rotation.

In another embodiment, a flange having an end face is provided between an end of the hose and the inside of the first hollow cylinder of the sleeve.

Further, the present invention includes a system in which the flange is fixedly connected to the hose for securing the hose from being pulled out of the socket.

According to the invention, it is also provided that the second hollow cylinder of the plug has a seal on its end face.

In another embodiment, the seal may be made of an elastic material.

Another aspect of the invention relates to the seal, which may be an O-ring or a flat seal.

In another embodiment of the system according to the present invention, the first hollow cylinder has a handle with a radially outwardly extending gripping surface on the opposite side to the retaining ring.

Another object of the present invention relates to a method of connecting a sleeve and a plug to form a fluidic connection, comprising the steps of:
  providing a sleeve comprising a first hollow cylinder, the channel of which is connected at one end to a hose and the other end of which comprises a first opening for receiving a plug, the end for receiving the plug being at least partially surrounded by a locking ring with a recess, wherein the first opening of the sleeve for receiving the plug extends at one side into a second opening which continues as a channel extending along the radius of the first hollow cylinder of the sleeve;
  insertion of the plug with a base plate, from which a second hollow cylinder extends, which has a hook arranged at the end opposite to the base plate, which hook extends radially outwards, wherein the second hollow cylinder is configured in such a way that it can be inserted at least partially into the first opening of the sleeve and the hook is configured in such a way that it can be inserted completely into the second opening of the sleeve and, during a rotational movement, the hook engages behind the locking ring of the sleeve to secure the plug against linear movement, the hook is configured in such a way that it can be inserted completely into the second opening of the sleeve and, during a rotational movement, the hook engages behind the securing ring of the sleeve to secure the plug against linear movement, the base plate of the plug having a projection with an edge which, during a rotational movement, engages in the recess of the securing ring of the sleeve to secure the plug against rotation, in the sleeve;
  rotation of the plug in the socket to secure the plug against linear movement by means of the locking ring; and
  rotate the plug in the socket until the edge of the base plate engages in the recess of the retaining ring to secure the plug against rotation.

Other aspects, features and advantages of the present invention will readily be apparent from the following detailed description, which simply sets forth preferred embodiments and implementations. The present invention may also be realized in other and different embodiments, and its various details may be modified in various obvious aspects, without departing from the teachings and scope of the present invention. Accordingly, the drawings and descriptions are to be considered illustrative and not limiting. Additional purposes and advantages of the Invention are set forth in part in the following description and will become apparent in part from the description or may be inferred from the embodiment of the invention.

BRIEF DESCRIPTION OF THE FIGURES

The invention is illustrated in more detail below with reference to figures. It will be obvious to those skilled in the art that these are only possible embodiments, without limiting the invention to the embodiments shown.

FIGS. 7A-7B show a hose coupling according to a preferred embodiment of the invention on a pipettor.

DETAILED DESCRIPTION OF THE INVENTION

The previously formulated problem is solved by the features of the independent claims. The dependent claims cover further specific embodiments of the invention.

The present invention provides a hose coupling for use with fluidic connections in analytical systems. The use in an analytical system is characterized by the hoses having an outer diameter of 10 mm or less. The hose coupling consists essentially of a sleeve and a plug, with both parts being shaped in a novel manner to ensure a secure connection. Furthermore, both parts have features that provide visual feedback on the condition of the connection.

In the context of the description of the invention, the sleeve is also referred to as the outer component or outer part. The plug is also referred to as the inner component or inner part. The plug may also be a part or connection of a device. The connected state refers to a state in which the inner part is in the outer part. The inner part and outer part are brought into a connected secured state by a rotary motion.

Figure 1:
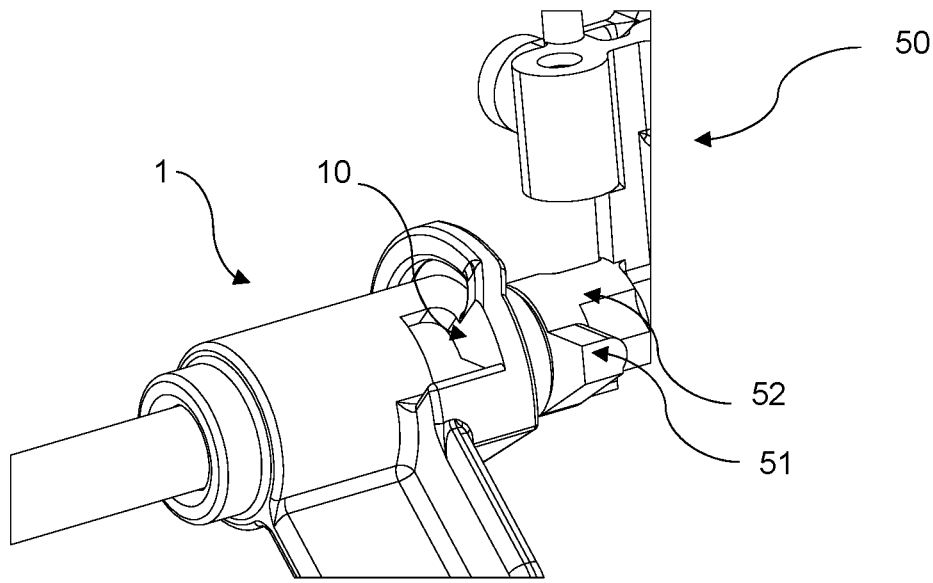
FIG. 1 shows a perspective view of both parts of the hose connection before the connector is inserted into the sleeve.

FIG. 1 shows a perspective view of the hose connection with sleeve 1 and plug 50 before the plug 50 is pushed into the sleeve 1. The plug 50 has a hook 51, which is inserted into opening 10 of the sleeve 1. Furthermore, the plug 50 has a hollow cylinder 52 with a central channel (not visible) for receiving fluids.

Figure 2:
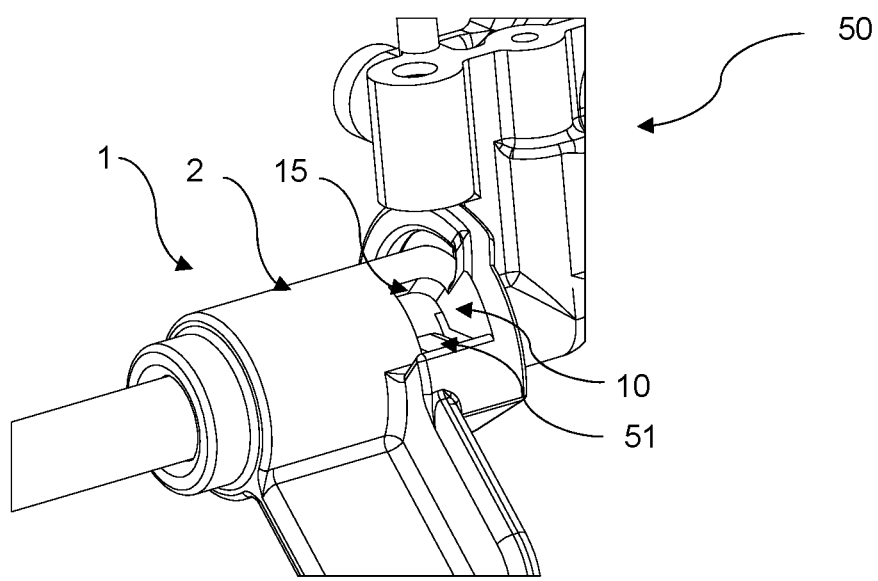
FIG. 2 shows a perspective view of both parts of the hose connection with the plug inserted and the connection not yet secured or closed.

FIG. 2 shows the condition when the plug 50 with hook 51 is inserted into sleeve 1 or opening 10. Furthermore, the hollow cylinder 52 is partially inserted into the hollow cylinder 2 of the socket 1 when both parts 1, 50 are connected (cf. FIG. 6). However, in FIG. 2, the two parts 1, 50 have not yet been brought into a closed secured state by a rotary movement.

Figure 3:
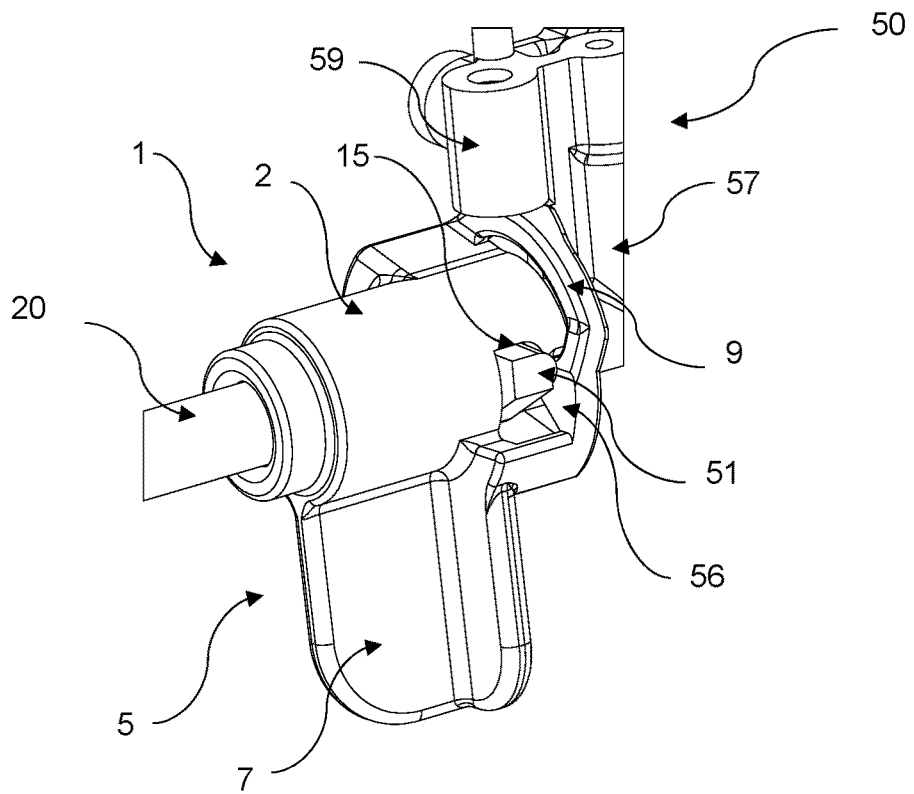
FIG. 3 shows a perspective view of both parts of the hose connection with the plug inserted in a secured or closed connection.

FIG. 3 shows a perspective view of the hose connection with both parts 1, 50 in the connected secured state. Sleeve 1 consists essentially of a hollow cylinder 2 with a handle 5 in the form of a surface 7 extending radially from the outside of the cylinder. The position of surface 7 in relation to base plate 57 of plug 50 indicates whether the two parts 1, 50 are in a connected secured state (FIG. 7A) or whether plug 50 is merely inserted into sleeve 1 without a secured connection having been established by a rotational movement (FIG. 7B). The hollow cylinder 2 of sleeve 1 of the hose coupling is firmly connected to a hose 20.

Figure 4:
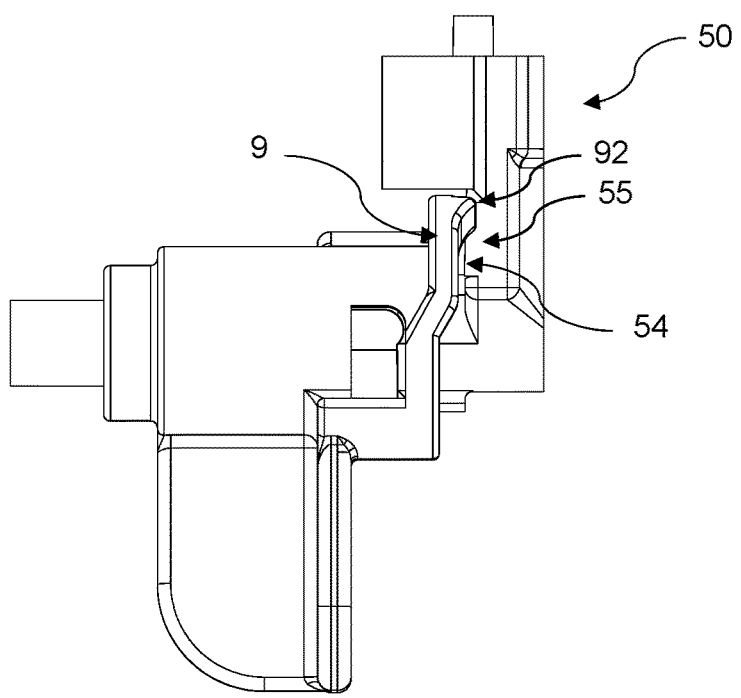
FIG. 4 shows a side view of both parts of the hose connection in the connected secured state.

At the open end for receiving the plug 50, the hollow cylinder 2 of sleeve 1 has a securing ring 9 partially surrounding this end, which is arranged on the opposite side of the hose connection with respect to the outer circumference of the hollow cylinder 2. Retaining ring 9 has a recess 91 in the direction of plug 50 (cf. FIG. 5), which in the connected secured state (FIG. 3) engages the projection 54 of edge 55 of plug 50 (cf. FIG. 4). Recess 91 is flanked on one side by protrusion 92, which allows engagement of protrusion 54 with recess 91 to achieve a fixed, but reversible, connection (see also FIG. 5). Protrusion 92 prevents unintentional loosening of the connection, since on the one hand protrusion 92 rests against edge 55 of protrusion 54, and on the other hand hook 51 prevents further rotation. Thus, the combination of projection 92 and hook 51 fixes the connection firmly but reversibly.

Hook 51 of plug 50 is rotated by the rotary movement in front of securing surface 56, so that the hook at the end of channel 15 (cf. FIG. 3) is surrounded by three sides of the channel, so that hook 51 can no longer be pulled out of socket 1 and thus overall pulling of plug 50 out of socket 1 is precluded. In addition, hook 51 causes contact pressure between the sealing surface or a flat seal and the O-ring after rotation in front of securing surface 56, which compresses the latter and thus securely seals the connection.

Figure 5:
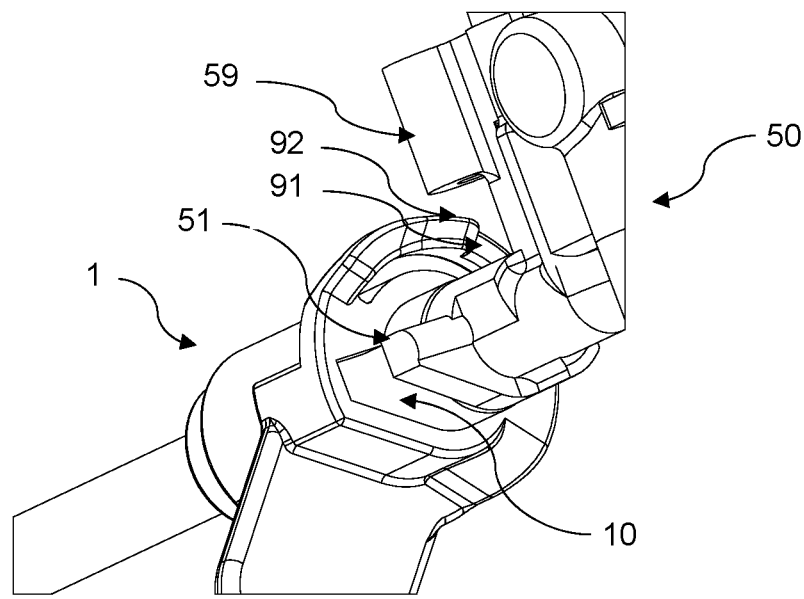
FIG. 5 shows a perspective view of the plug with hook before it is inserted into the sleeve.

FIG. 5 shows in perspective view connector 50 with hook 51 before it is inserted into the sleeve. It is obvious that the cylinder 59 can also have a different geometric shape to make it suitable for indicating the status of the connection of the two parts.

Figure 6:
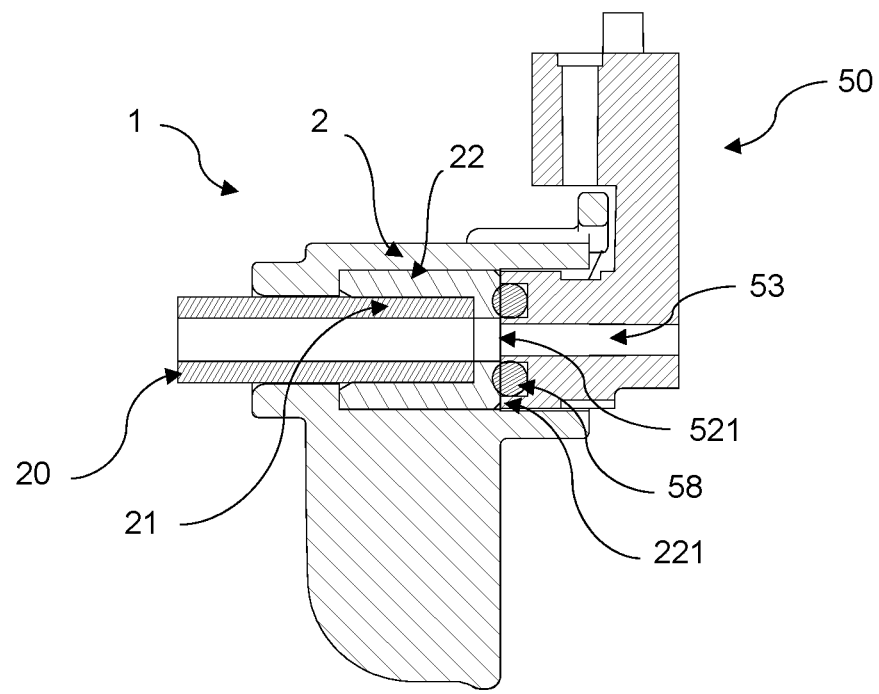
FIG. 6 shows sectional drawing through both parts of the hose connection in the closed secured state.

FIG. 6 shows in cross-section sleeve 1 and plug 50 in the connected secured condition. The sleeve 1 is connected to a hose 20 at the opposite end to the end connected to the plug 50. A flange 22 is arranged between the hose end 21 and the hollow cylinder 2 of the sleeve 1, the end face 221 of which serves as a sealing surface for an elastic seal 58 in the end face 521 of the hollow cylinder 52 of the plug 50. An embodiment with flange 22 and elastic seal 58 ensures reliable sealing of the transition from hose 20 into the channel 53 of the hollow cylinder of the plug 50. Another advantage of the flange is that it ensures that the hose does not twist when the connection is closed.

FIGS. 7A-7B show a hose coupling according to the present invention as part of a pipetting device 30. In this specific example of use, it is advantageous if a user can immediately tell by the position of the face 7 whether the connection is in a fixed, secured state or is open. In FIG. 7A, the connection is fixed, secured. In FIG. 7B, the surface 7 is twisted or angled and thus the connection is not secured in the sense that it is tight.

The advantages of a hose connection according to the present invention can be summarized as follows:

Unlike a threaded screw connection, the connection of the parts is independent of a tightening torque.

The position of the socket and plug in relation to each other or the lug on the socket directly indicates whether the connection is closed or open.

Socket and plug can be manufactured by simple processes, e.g., injection molding.

The closed connection is mechanically secured.

The foregoing description of the preferred embodiment of the invention has been given for the purpose of illustration and description. It is not intended to be exhaustive or to limit the invention precisely to the disclosed form. Modifications and variations are possible in view of the above teachings or may be obtained from practice of the invention. The embodiment has been chosen and described to explain the principles of the invention and its practical application to enable those skilled in the art to use the Invention in various embodiments suitable for the particular use intended. It is intended that the scope of the invention be defined by the appended claims and their equivalents. The entirety of each of the foregoing documents is incorporated herein by reference.

REFERENCE NUMERALS

1 Sleeve
2 Hollow cylinder sleeve
5 Handle
7 Area
9 Circlip
10 Opening
15 Channel
20 Hose
21 Hose end
22 Flange
221 Front face flange
30 Pipettor
50 Plug
51 Hooks
52 Hollow cylinder plug
53 Channel hollow cylinder
54 Head start
55 Edge
56 Fuse area
57 Base plate
58 Seal
59 Cylinder
91 Recess Circlip
92 Lead
521 Front face hollow cylinder

What is claimed is:

1. A hose coupling for a fluidic connection in an analytical system, comprising:
 a sleeve comprising a first hollow cylinder, a channel of which is connected at one end to a hose and the other end of which comprises a first opening for receiving a plug, the end for receiving the plug being at least partially surrounded by a locking ring with a recess, the first opening of the sleeve for receiving the plug extending at one side into a second opening which continues as a channel extending along a radius of the first hollow cylinder, wherein a flange having a face is disposed between an end of the hose and an inside of the first hollow cylinder of the sleeve; and
 the plug having a base plate from which extends a second hollow cylinder which has a hook arranged at an end opposite the base plate and extending radially outwardly, the second hollow cylinder being configured such that the second hollow cylinder is at least partially insertable into the first opening of the sleeve and the hook is configured such that the hook can be inserted completely into the second opening of the sleeve and, during a rotational movement, the hook engages behind the locking ring of the sleeve to secure the plug against linear movement, the base plate of the plug having a projection with an edge which, during a rotational movement, engages in the recess of the locking ring of the sleeve to secure the plug against rotation.

2. The system of claim 1, wherein the flange is fixedly connected to the hose for securing against withdrawal of the hose from the sleeve.

3. The system of claim 1, wherein the second hollow cylinder of the plug has a seal on an end face.

4. The system of claim 3, wherein the seal is made of a resilient material.

5. The system of claim 3, wherein the seal is an O-ring or a flat seal.

6. The system of claim 1, wherein the first hollow cylinder has a handle on an opposite side to the locking ring with a radially outwardly extending gripping surface.

7. A method of connecting a sleeve and a plug to create a fluidic connection, comprising the steps of:
providing a sleeve comprising a first hollow cylinder, a channel of which is connected at one end to a hose and the other end of which comprises a first opening for receiving a plug, the end for receiving the plug being at least partially surrounded by a locking ring with a recess, wherein the first opening of the sleeve for receiving the plug extends at one side into a second opening which continues as a channel extending along a radius of the first hollow cylinder, wherein a flange having a face is disposed between an end of the hose and an inside of the first hollow cylinder of the sleeve;
inserting the plug with a base plate, from which a second hollow cylinder extends, which has a hook arranged at an end opposite to the base plate, which hook extends radially outwards, wherein the second hollow cylinder is configured in such a way that the second hollow cylinder can be inserted at least partially into the first opening of the sleeve and the hook is configured in such a way that the hook can be inserted completely into the second opening of the sleeve and, during a rotational movement, the hook engages behind the locking ring of the sleeve to secure the plug against linear movement, the base plate of the plug having a projection with an edge which, during a rotational movement, engages in the recess of the locking ring of the sleeve to secure the plug against rotation, in the sleeve;
rotating the plug in the first opening to secure the plug against linear movement by means of the locking ring; and
rotating the plug in the first opening until the edge of the base plate engages in the recess of the locking ring to secure the plug against rotation.

* * * * *